C. T. HENDERSON.
MOTOR CONTROLLER.
APPLICATION FILED APR. 23, 1909.
1,062,590.
Patented May 27, 1913.
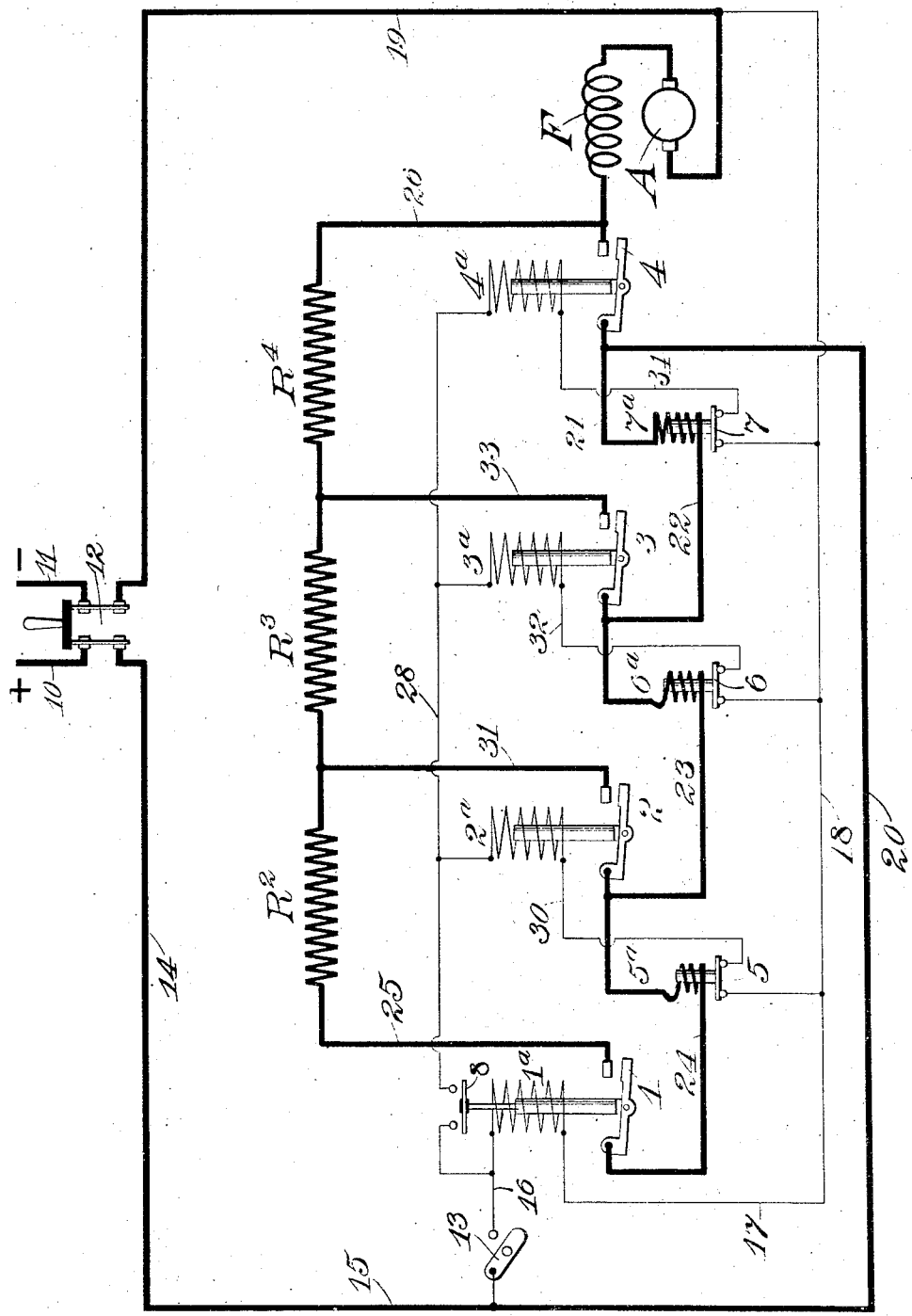
Witnesses:
George Haynes
S. W. Fitzgerald
Inventor:
Clark T. Henderson.
By Edwin B. H. Tower Jr.
Atty.

UNITED STATES PATENT OFFICE.

CLARK T. HENDERSON, OF MILWAUKEE, WISCONSIN, ASSIGNOR TO THE CUTLER-HAMMER MFG. CO., OF MILWAUKEE, WISCONSIN, A CORPORATION OF WISCONSIN.

MOTOR-CONTROLLER.

1,062,590.  Specification of Letters Patent.  Patented May 27, 1913.

Application filed April 23, 1909. Serial No. 491,669.

*To all whom it may concern:*

Be it known that I, CLARK T. HENDERSON, a citizen of the United States, residing at Milwaukee, in the county of Milwaukee and State of Wisconsin, have invented new and useful Improvements in Motor-Controllers, of which the following is a full, clear, concise, and exact description, reference being had to the accompanying drawing, forming a part of this specification.

My invention relates to improvements in controllers for electric motors.

More particularly it relates to controllers in which a plurality of automatic switches are provided for accelerating the motor, and in which each of the accelerating switches is provided with an automatic relay device for preventing the operation thereof, while there is an excessive flow of current through the motor.

According to my present invention, I arrange the relay devices in such a manner that they will all respond immediately upon closure of the motor circuit to render all of the accelerating switches inoperative, and to thereafter operate successively as the flow of current through the motor decreases to cause successive operation of the accelerating switches.

In order to more fully disclose the characteristic features of my invention, I shall describe the controller diagrammatically illustrated in the accompanying drawing which embodies my invention in its preferred form. Of course, my invention is susceptible of various modifications.

The controller illustrated includes a main line switch 1, resistance switches 2, 3 and 4. and relay switches 5, 6 and 7. The main switch 1 has an operating winding $1^a$. The plunger of the winding $1^a$ carries a contact disk 8 adapted, when the main switch 1 is closed, to bridge a pair of stationary contacts. The purpose of this contact disk will be hereinafter set forth. The resistance switches 2, 3 and 4 are provided with operating windings $2^a$, $3^a$ and $4^a$, and are adapted to control resistance sections $R^2$, $R^3$ and $R^4$ respectively. The resistances just mentioned are arranged in series with the motor, which, as illustrated, is provided with an armature A and a series field winding F. Each of the relay switches 5, 6 and 7 is connected in circuit with the operating winding of one of the resistance switches. The relay switches 5, 6 and 7 are provided with operating windings $5^a$, $6^a$ and $7^a$ respectively, each of which winding is adapted to operate its corresponding relay switch to open the circuit of one of the resistance switches. As will be hereinafter more clearly set forth, the operating windings of the relay switches are all connected in series with the motor, whereby when the motor circuit is closed, current will flow through all of said windings. In order that the operation of this controller may be more clearly understood, let it be assumed that a current of say 300 amperes, flowing through the windings of the relay switches, will cause all of said windings to respond, thereby opening all of the relay switches. Let it be further assumed that the windings of the relay switches are so adjusted that they will release their respective switches and allow the same to return to closed position as the current in the motor circuit decreases. For instance, winding $5^a$ may be adjusted to release the switch 5 when the current through the motor is decreased to 250 amperes; winding $6^a$ to release the switch 6 upon a further drop of 25 amperes; and winding $7^a$ to release the switch 7 upon a still further drop of 25 amperes.

I shall now describe the operation of the controller.

Current is supplied from main lines 10 and 11 through a main line switch 12, and the circuit of the operating winding $1^a$ of the main switch, is initially controlled by switch 13. Upon closure of switch 13, current will flow from main line 10 by conductors 14 and 15 through switch 13, by conductor 16 through the operating winding $1^a$, by conductors 17, 18 and 19 to the negative line 11 of the supply circuit. This completes the circuit through the winding $1^a$, which thereupon becomes energized and closes the switch 1. Closure of the switch 1 completes the motor circuit from conductor 15 by conductors 20 and 21, through the winding $7^a$ of the relay switch 7 by conductor 22, through the winding $6^a$ by conductor 23, through the winding $5^a$ by conductor 24, through main line switch 1 by conductor 25, through the resistance sections $R^2$, $R^3$ and $R^4$; thence by conductor 26 through the series field winding F and armature A to conductor 19. It will thus be seen that the motor is started with all of the starting resistance in circuit, and that if the starting resistance is so designed that upon initial closure of the motor circuit a current of 300 amperes will flow through the motor circuit, that the windings $5^a$, $6^a$ and $7^a$ will all respond, thereby opening all of the relay switches. Upon closure of the main switch 1, the contact disk 8 bridges its stationary contacts, thereby connecting conductor 28 to conductor 16. The operating winding of each of the resistance switches is connected to conductor 28, and hence current would flow through these operating windings as soon as the main switch was closed, but for the fact that in the meantime their circuits have been opened at other points by their respective relay switches. Consequently, none of the resistance switches will close until their respective relay switches have returned to initial position. It is well understood that upon initial closure of the motor circuit there is a heavy rush of current through the motor, due to the fact that when the motor armature is at rest, there is little or no drop in potential across its terminals. It is also understood that as the motor armature increases in speed, it generates a gradually increasing C. E. M. F., which, in turn, gradually reduces the flow of current in the motor circuit. Hence, at a certain stage in the starting period, the motor will generate a sufficient C. E. M. F. to reduce the flow of current through the motor circuit from 300 to 250 amperes. When the current through the motor circuit is reduced to this value, the winding $5^a$ will permit the relay switch 5 to return to initial position. The return of the relay switch 5 to initial position completes the circuit of the operating winding $2^a$ of the resistance switch 2. The circuit of this winding may then be traced from conductor 28 through the winding $2^a$, by conductor 30 through the switch 5, to conductor 18, and thence to the negative line. The winding $2^a$ thereupon becomes energized and closes the switch 2. The pivotal point of switch 2 being connected to conductor 23, it will be seen that upon closure of said switch, the resistance $R^2$ will be shortcircuited from the motor circuit, the current then flowing from conductor 23 through the switch 2 by conductor 31 through the resistance sections $R^3$ and $R^4$, and thence through the motor as already traced. It will also be seen that closure of the switch 2 shortcircuits the winding $5^a$ of the relay switch 5, and consequently said relay switch is thereafter rendered inoperative. Upon removal of the resistance $R^2$ from the motor circuit, it will be understood that the flow of current through the motor, will immediately increase above 250 amperes, and will then gradually decrease as the armature increases in speed and generates an increased C. E. M. F. After a certain interval, the current in the motor circuit will decrease to 225 amperes, whereupon the winding $6^a$ will permit the relay switch 6 to return to initial position. Closure of the relay switch 6 completes the circuit of the winding $3^a$ of the resistance switch 3. The circuit of this winding may then be traced from conductor 28 through said winding by conductor 32 through the switch 6, and thence to conductor 18. Energization of the winding $3^a$ will cause the closure of resistance switch 3. It will be seen, however, that the circuit of the operating winding of this resistance switch will not be completed until the current through the motor has decreased to a safe value. Upon closure of the switch 3, the motor circuit extends from conductor 22 through the switch 3 by conductor 33 through the resistance $R^4$, and conductor 26 through the motor. This shortcircuits the resistance $R^3$, and also shortcircuits the operating winding $6^a$ of the relay switch 6. Removal of the resistance $R^3$ from the motor circuit temporarily causes another increased surge of current through the motor. But in a short period the C. E. M. F. of the motor armature increases sufficiently to reduce the flow of current to 200 amperes. Thereupon the winding $7^a$ drops its plunger, thereby causing the relay switch 7 to complete the circuit of the operating winding of the resistance switch 4. The circuit of this winding may be traced from conductor 28 through said winding by conductor 34 through the switch 7 to conductor 18. Closure of the switch 4 completes the motor circuit from conductor 20 through switch 4, thence directly through the motor to conductor 19. Upon the removal of all of the starting resistance, the motor will quickly come up to normal speed.

With the arrangement illustrated, it will be seen that the relay devices operate successively to cause a successive operation of the resistance switches. But the relay switches operate to accomplish this result in such a manner that the motor is always protected against an excessive rush of current therethrough.

Having thus described my invention, what I claim as new and desire to secure by Letters Patent, is:

1. In a controller for electric motors, in combination, a plurality of automatic resistance switches and automatic means adapted to operate immediately upon closure of the motor circuit to render said switches temporarily inoperative for varying periods.

2. In a controller for electric motors, in combination, a plurality of automatic resistance switches and electroresponsive means adapted to respond immediately upon closure of the motor circuit to temporarily prevent operation of said switches for varying periods.

3. In a controller for electric motors, in combination, a plurality of automatic resistance switches and automatic means adapted to operate immediately upon closure of the motor circuit to render said switches inoperative and to thereafter cause said switches to operate successively as predetermined electrical conditions are established.

4. In a controller for electric motors, in combination, a plurality of automatic resistance switches and electroresponsive means adapted to respond immediately upon closure of the motor circuit to render said switches temporarily inoperative and to thereafter cause said switches to operate successively as predetermined electrical conditions are established.

5. In a controller for electric motors, in combination, a plurality of automatic resistance switches and a plurality of electroresponsive devices, one for controlling each of said switches, all of said devices being adapted to respond upon closure of the motor circuit and to thereafter cause successive operation of said switches as predetermined electrical conditions are established.

6. In a controller for electric motors, in combination, a plurality of automatic resistance switches, a plurality of automatic devices, one for controlling each of said switches, said devices being arranged to render all of said switches inoperative upon the closure of the motor circuit and to thereafter cause the same to operate successively as predetermined electrical conditions are established, each of said resistance switches upon closing insuring against further operation of its corresponding controlling device.

7. In a controller for electric motors, in combination, a plurality of automatic resistance switches, a plurality of electroresponsive devices, one for controlling each of said switches, said devices being adapted to respond, upon the closure of the motor circuit, to render said switches inoperative and to thereafter successively return to initial position as predetermined electrical conditions are established, to cause the operation of their respective resistance switches.

8. In a controller for electric motors, in combination, a plurality of automatic resistance switches, a plurality of electroresponsive devices, one for controlling each of said switches, said devices being adapted to respond, upon the closure of the motor circuit, to render said switches inoperative, and to thereafter successively return to initial position as predetermined electrical conditions are established, to cause the operation of their respective resistance switches, the operating winding of each of said devices being shortcircuited upon the closure of its respective resistance switch.

9. In a controller for electric motors, in combination, a plurality of electromagnetically operated resistance switches, an electroresponsive controlling switch arranged in circuit with the operating winding of each of said resistance switches, the operating windings of said controlling switches being connected in the motor circuit to operate said controlling switches upon closure of the motor circuit, said controlling switches being arranged to successively return to initial position to cause the energization of the windings of their corresponding resistance switches as the flow of current through the motor decreases.

10. In a controller for electric motors, in combination, a plurality of electromagnetically operated resistance switches, an electroresponsive controlling switch arranged in circuit with the operating winding of each of said resistance switches, the operating windings of said controlling switches being connected in the motor circuit to operate said controlling switches upon closure of the motor circuit, said controlling switches being arranged to successively return to initial position to cause the energization of the windings of their corresponding resistance switches as the flow of current through the motor decreases, and circuit connections whereby the winding of each of said controlling switches is shortcircuited upon the closure of its corresponding resistance switch.

In witness whereof, I have hereunto subscribed my name in the presence of two witnesses.

CLARK T. HENDERSON.

Witnesses:
FRANK H. HUBBARD,
S. W. FITZ GERALD.